US012489868B2

(12) United States Patent
Winsvold et al.

(10) Patent No.: US 12,489,868 B2
(45) Date of Patent: Dec. 2, 2025

(54) PREVENTING FACES DETECTED ON A VIDEO DISPLAY SCREEN FROM ASSIGNMENT TO SEPARATE WINDOW DURING VIDEO CONFERENCE

(71) Applicant: Cisco Technology, Inc., San Jose, CA (US)

(72) Inventors: Bjørn Winsvold, Tranby (NO); Asbjørn Therkelsen, Nesbru (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 210 days.

(21) Appl. No.: 18/509,489

(22) Filed: Nov. 15, 2023

(65) Prior Publication Data
US 2025/0159108 A1 May 15, 2025

(51) Int. Cl.
H04N 7/15 (2006.01)
G06T 3/40 (2024.01)
G06T 5/70 (2024.01)
G06V 40/16 (2022.01)

(52) U.S. Cl.
CPC ............ H04N 7/152 (2013.01); G06T 3/40 (2013.01); G06T 5/70 (2024.01); G06V 40/161 (2022.01); G06V 40/172 (2022.01)

(58) Field of Classification Search
CPC ...... H04N 7/152; H04N 7/147; G06V 40/161; G06V 40/172; G06V 40/167; G06V 40/173; G06V 40/174; G06V 40/16; G06T 3/40; G06T 5/70; G06T 3/4046
See application file for complete search history.

(56) References Cited

U.S. PATENT DOCUMENTS

| 8,218,831 B2 | 7/2012 | Tian et al. |
| 9,712,783 B2 | 7/2017 | Aarrestad et al. |
| 2007/0188597 A1* | 8/2007 | Kenoyer ............... H04N 7/147 348/14.08 |
| 2010/0315484 A1 | 12/2010 | Ramanathan et al. |
| 2013/0050398 A1 | 2/2013 | Krans et al. |
| 2015/0138302 A1* | 5/2015 | Sethi ................... H04N 7/15 348/14.07 |
| 2016/0227163 A1* | 8/2016 | Aarrestad ............ G06V 40/166 |
| 2023/0138733 A1* | 5/2023 | Springer ............. H04N 7/0135 348/14.08 |

FOREIGN PATENT DOCUMENTS

JP 2008306265 A * 12/2008

* cited by examiner

Primary Examiner — Yogeshkumar Patel
(74) Attorney, Agent, or Firm — Edell, Shapiro & Finnan, LLC

(57) ABSTRACT

Video is obtained in a video conference session that includes one or more participants in a video conference room, wherein the video conference room includes a video display and a one video camera, and wherein a participant is remote with respect to the video conference room. During the video conference session, it is determined that video captured by the camera in the video conference room includes a face of a person not physically present in the video conference room and which face is displayed on the video display. Video of each participant in the video conference room is assigned to a respective video layout window except for video of the face of the person not physically present in the video conference room that is displayed on the video display.

20 Claims, 11 Drawing Sheets

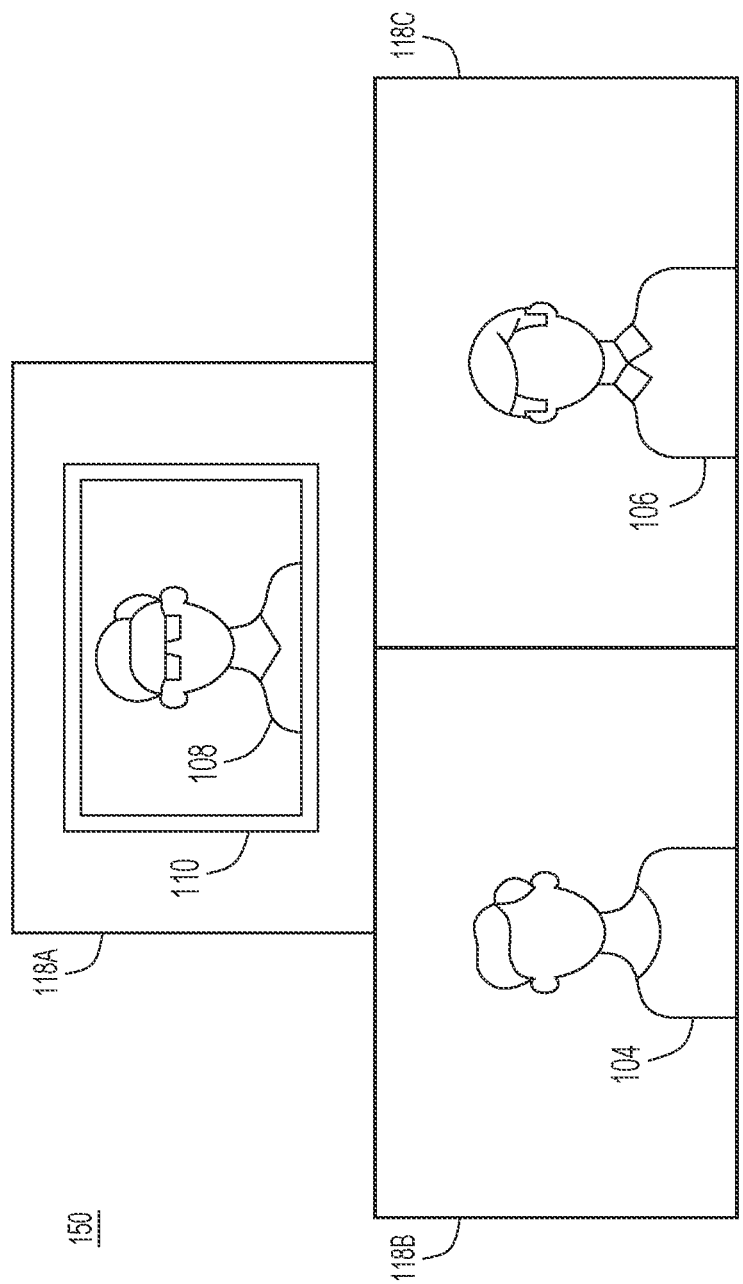

PREVENTING FACES DETECTED ON A VIDEO DISPLAY SCREEN FROM ASSIGNMENT TO SEPARATE WINDOW DURING VIDEO CONFERENCE

TECHNICAL FIELD

The present disclosure relates generally to video conferencing.

BACKGROUND

Video conferencing refers to the technology that enables groups of users in different locations to hold a live, real-time meeting using video and audio communication over a network. Video conferencing enables users to see and hear each other, including combinations of local participants (e.g., individuals in a video conference room) and remote participants. Many video conference applications employ face detection techniques in which computer algorithms can detect and track human faces within the video of the participants. By detecting the faces of participants, auto-framing operations can be performed in which individual participants' faces are extracted and isolated to separate windows presented on a display panel during a video conference session. Thus, each participant can be presented to the other participants in a dedicated window, enabling participants to focus their attention on a particular person, or enabling certain windows to be highlighted when that participant is speaking, among other features.

BRIEF DESCRIPTION OF THE DRAWINGS

FIG. 1C is a diagram depicting a video layout presenting a video layout for a video conference session, according to conventional techniques.

DETAILED DESCRIPTION

Overview

Figure 1A:
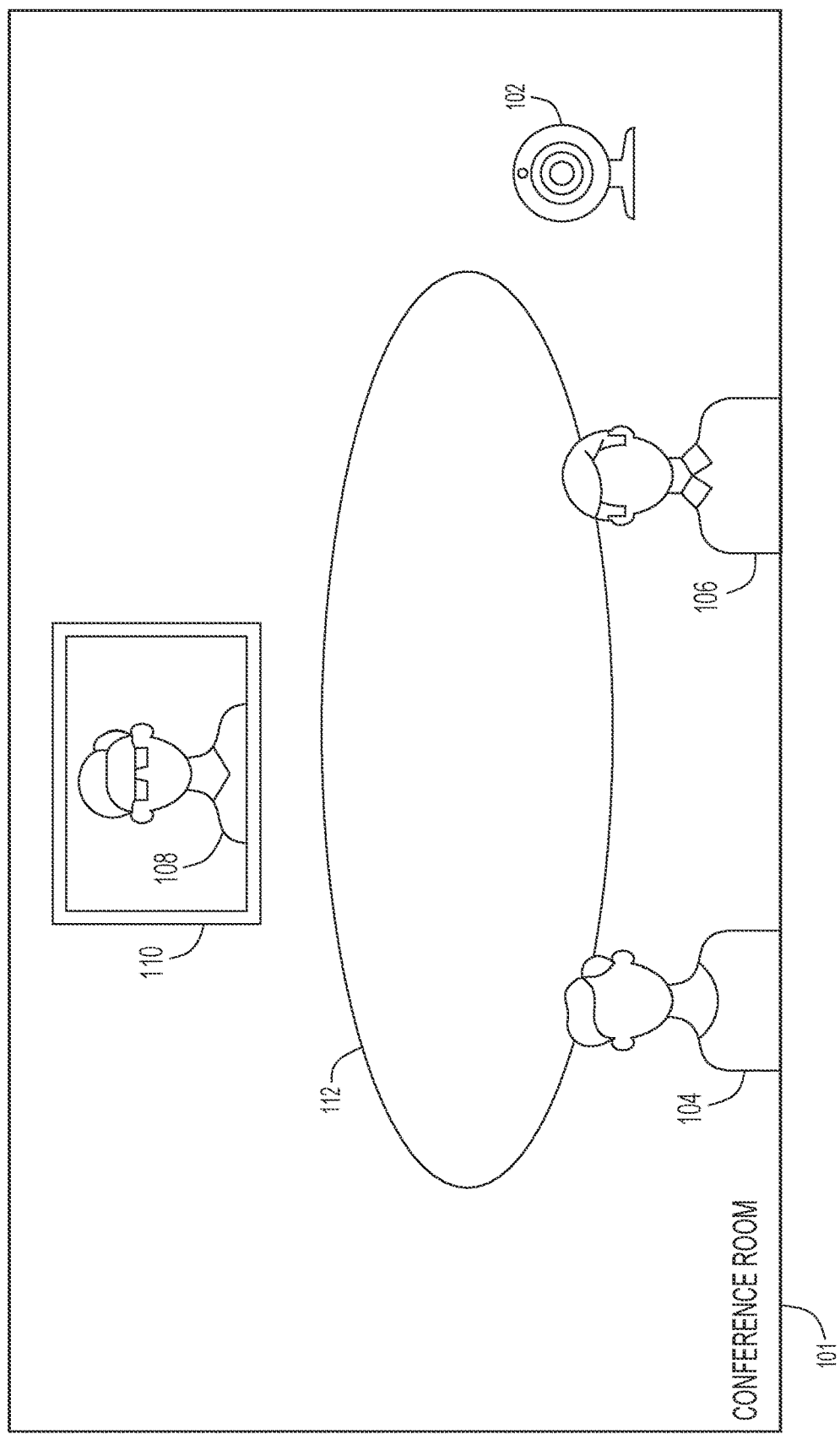
FIG. 1A is a diagram depicting a video conference session including participants in a first conference room.

According to one embodiment, techniques are provided for preventing faces displayed on a video display screen from being assigned a separate window in video conference sessions. One or more videos are obtained in a video conference session that includes one or more participants in a video conference room, wherein the video conference room includes one or more video displays and at least one video camera, and wherein one or more remote participants are remote with respect to the video conference room. During the video conference session, it is determined that video captured by the at least one video camera in the video conference room includes a face of a person not physically present in the video conference room and which face is being displayed on the one or more video displays. Video of each participant in the video conference room is assigned to a respective video layout window of a plurality of video layout windows except for video of the face of the person not physically present in the video conference room that is displayed on the one or more video displays.

EXAMPLE EMBODIMENTS

Present embodiments relate to video conferencing, and more specifically, to preventing faces displayed on a video display screen from being assigned a separate window in video conference sessions. In the context of video conferencing, auto-framing is a feature that employs software algorithms to automatically adjust the framing or composition of video. By detecting and tracking participants' faces, the software (or a hardware camera system) can perform pan, tilt, zoom, and/or crop operations in order to ensure that participants' faces are prominently displayed in a feed. Video conferencing systems can identify each participant, and extract an isolated view of each participant that can be provided to its own dedicated window to be presented in a video layout on a display panel, such as a display panel in a video conference room. Thus, when there are multiple local participants in a video conference room, a system can create a separate video stream for each local participant, rather than presenting a single view (e.g., a unedited view captured by a video camera in the room).

A video conference room may include a video camera and a microphone to capture video and audio of the local participants, and a display and speakers so that the local participants can see and hear the remote participants. However, when a display in the room is in view of a camera in the room, the camera can acquire video of the display, which may be presenting video, such as video of a remote participant, or shared content that includes a face of a person, in a video conference session. Thus, when auto-framing techniques are performed, a face of a participant (or face in shared content) that is presented on a video display may erroneously be extracted and assigned its own window or pane in video layout for video to be sent to a remote location. Since the video of the participant in the video display is detected as a face, this can lead to assigning a window or pane for that person or face despite the fact that the person or face is not physically present in the conference room.

To address this problem, the embodiments presented herein preventing faces displayed on a video display screen from being assigned a separate window in video conference sessions by identifying displays visible to a video camera in a conference room and determining that a face in the area of the display corresponds to a user who is not physically present in the room. Thus, the video of a face that is presented on a display in the conference room and captured by a video camera in the conference room is not associated with its own outgoing video feed, and is not assigned its own window or pane in a video layout to be sent to a remote location involved in the video conference session.

Thus, present embodiments improve the technical field of video conferencing by omitting, from video sent to a far end location in a video conference session, faces in a video conference session when those faces are not associated with local participants (participants physically in a near end location/conference room) in a video conference session. Present embodiments provide the practical application of improving collaboration during video conference sessions by reducing user confusion such that faces displayed on a video display screen (and thus faces associated with participants not in the local conference room) are not assigned to a separate window, or pane which can otherwise be distracting to both local and remote participants.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

With reference first to FIG. 1A, a block diagram is shown that depicts a video conference session 100 including participants in a first conference room 101, according to an example embodiment. As depicted, video conference session 100 is occurring in a conference room 101 that has at least one video camera 102 and two local participants 104 and 106. Additionally, conference room 101 includes a display 110 that is presenting video of a remote participant 108. The conference room 101 may include a conference table 112 around which local participants, e.g., participants 104 and 106, may be positioned/arranged. The display 110 may be positioned on one side of the conference room 101 or on the wall of the conference room. There may be multiple displays 110 and/or multiple video cameras 102 in conference room 101, depending on the size and capabilities of the conference room 101. Notably, the display 110 is at a location in the conference room 101 in which it is within the field of view of the video camera 102. In other words, the video camera 102 will capture video of the video stream of participant 108 that is being presented on the display 110.

Figure 1B:
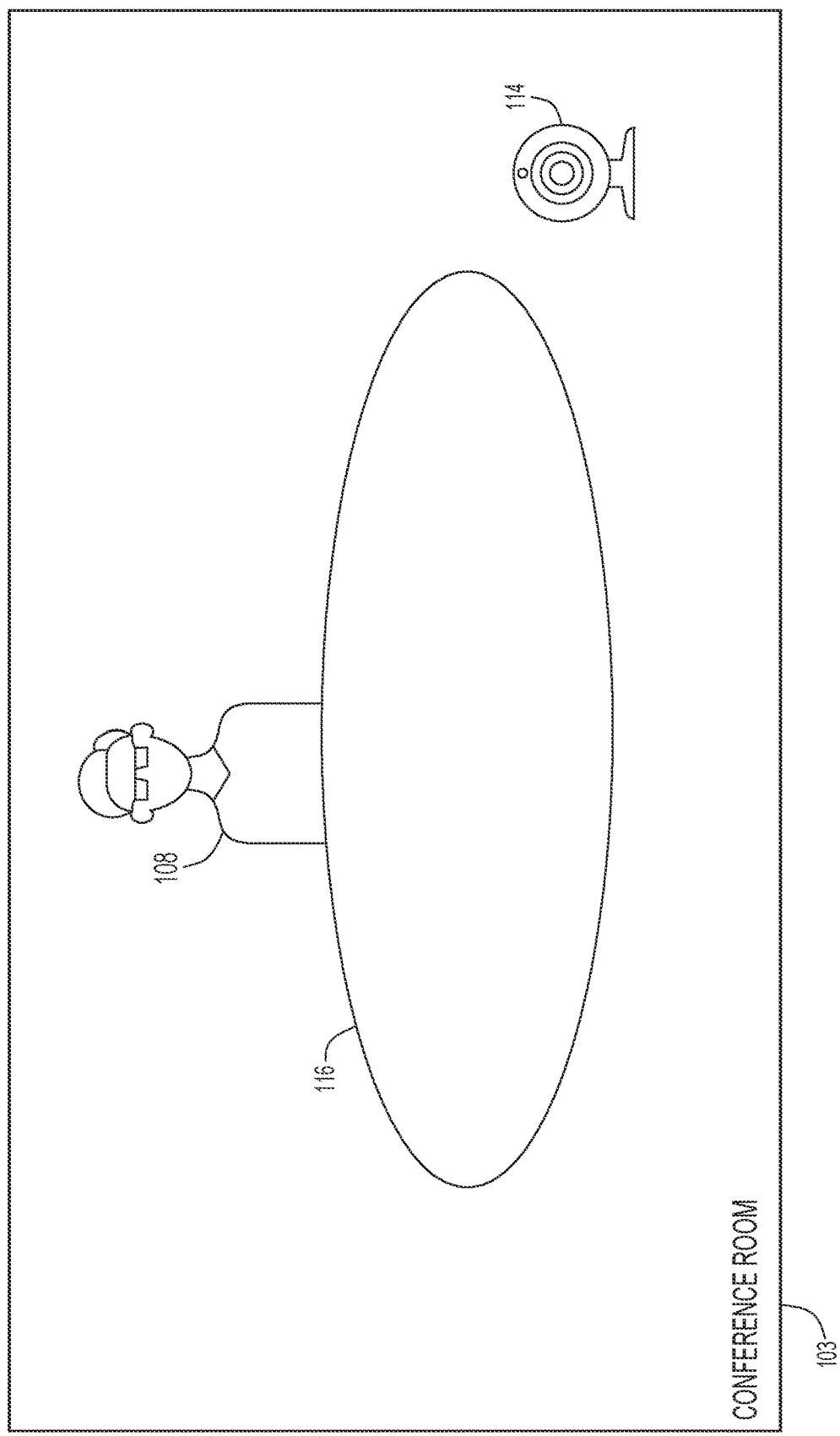
FIG. 1B is a diagram depicting a video conference session including a participant in a second conference room.

FIG. 1B is a diagram depicting a participant in a second conference room 103 that is participating in the video conference session 100. The second conference room 103 may include a participant 108, a camera 114, and a conference table 116. Participant 108 is participating in the video conference session 100 with the participants in the first conference room 101 (i.e., participants 104 and 106) shown in FIG. 1A. Thus, participant 108 may be referred to as a remote participant (at a remote or far end location) with respect to the participants 104 and 106 in the first conference room 101 that may be referred to as a local or near end location. As such, participant 108 is presented in display 110 of the first conference room 101 so that participants 104 and 106 can see participant 108.

FIG. 1C is a diagram of a video layout 150 for a video conference session, according to conventional techniques. In the example shown in FIG. 1C, video layout 150 is an example of a video layout of outgoing video for the video conference session 100 that is depicted in FIGS. 1A and 1B. The video layout 150 includes a plurality of windows or panes (separate video areas) 118A-118C. As the example in FIG. 1C is provided to illustrate the result of applying conventional auto-framing techniques, local participants 104 and 106 are assigned to their own dedicated windows 118B and 118C, respectively, for an outgoing video to video conference room 103. However, participant 108, who is remote (i.e., not physically present in the first conference room 101), is also assigned to a window 118A, which contains video captured by camera 102 on the display 110 in video conference room 101 on which incoming video of participant 108 is being displayed during the video conference session 100. Thus, FIG. 1C shows how conventional techniques can erroneously include video containing a face of a remote participant in the outgoing video for a conference room that should instead only perform auto-framing on local participants in that conference room. This can be distracting and undesirable.

Figure 2:
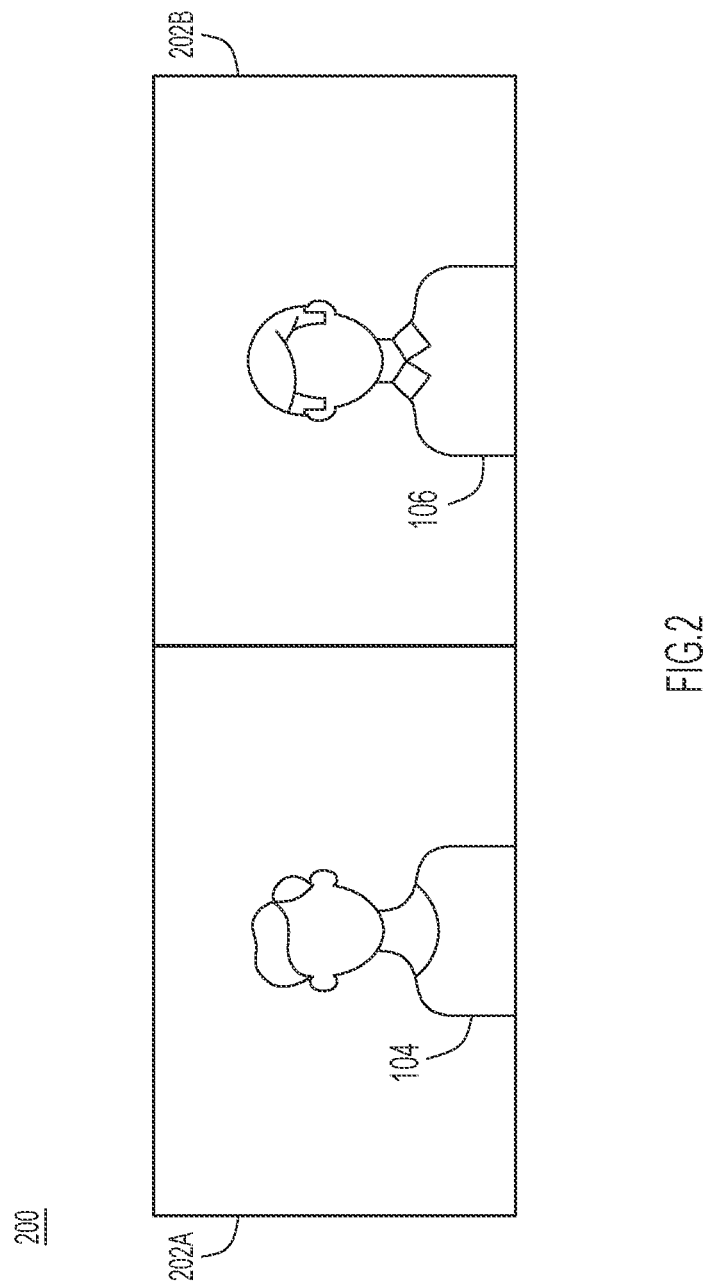
FIG. 2 is a diagram of a video layout presenting a video layout for a video conference session generated according to techniques of an example embodiment.

FIG. 2 is a diagram of a video layout 200 for a video conference session, according to an example embodiment. Like video layout 150 of FIG. 1C, video layout 200 also corresponds to video conference session 100 that is depicted in FIGS. 1A and 1B. However, unlike video layout 150 of FIG. 1C, which is generated using conventional techniques, video layout 200 is instead generated according to techniques presented herein. Video layout 200 may correspond to an outgoing video feed from the first conference room 101 (e.g., video associated with a view that is presented to a remote participant, such as participant 108). As depicted, video layout 200 includes windows or panes 202A and 202B. By employing the techniques presented herein, the video feed (video stream) of remote participant 108 that is presented on the display 110 of conference room 101 is detected as a remote face, not the face of a local participant in the first conference room 101, and is therefore not assigned to its own window or pane of outgoing video of video layout 200. Thus, video layout 200 includes only windows 202A and 202B for participants 104 and 106, who are the physically-present participants in the first conference room 101.

Figure 3A:
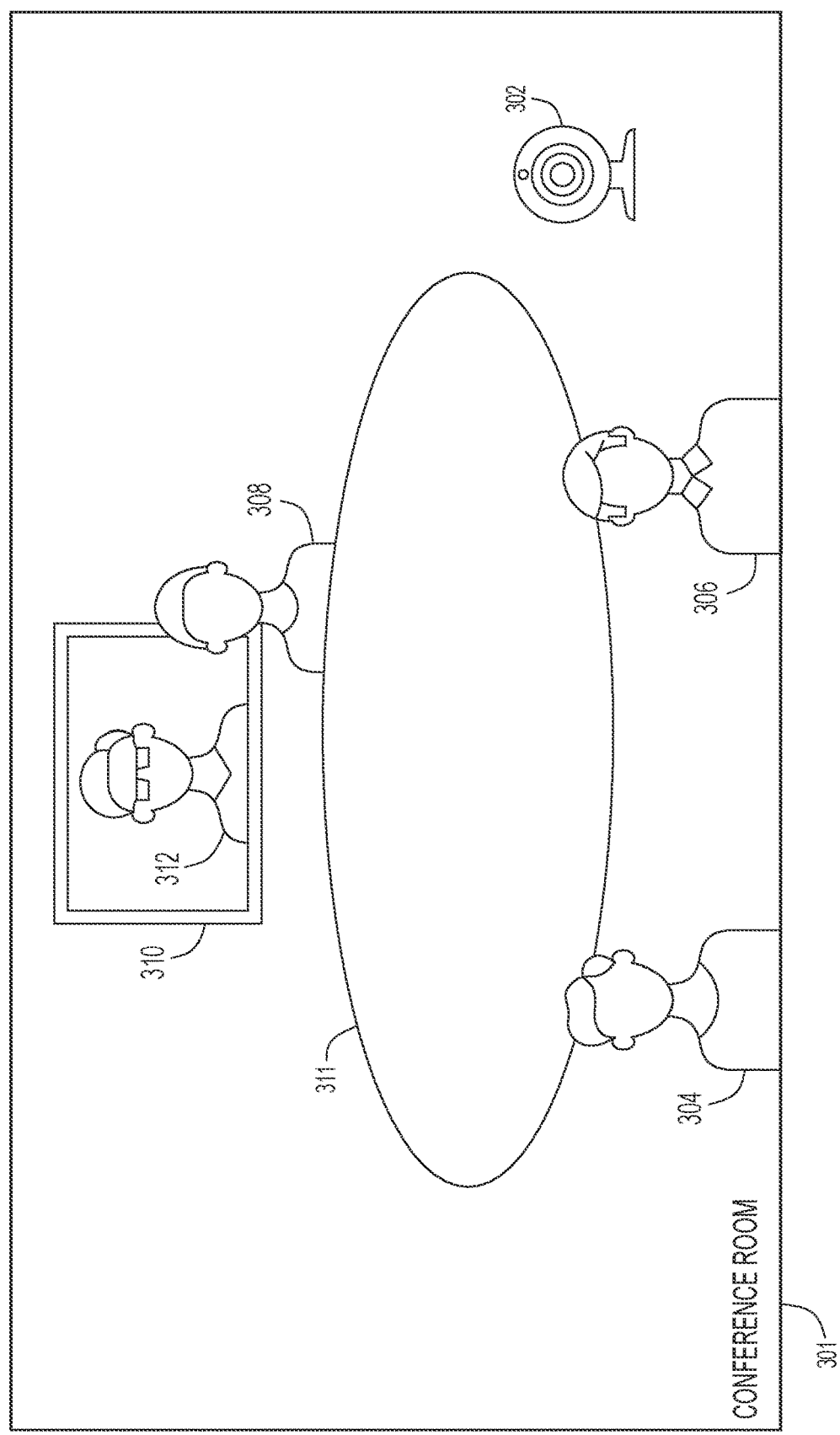
FIG. 3A is a diagram depicting a video conference session, according to an example embodiment.

FIG. 3A is a diagram depicting a video conference session 300, according to an example embodiment. As depicted, video conference session 300 includes three participants 304, 306, and 308 around a conference table 311, who are all local to conference room 301. Conference room 301 also includes a video camera 302 and a display 310. In the depicted embodiment, participant 308 is sitting in front of, or otherwise adjacent to, display 310, and display 310 is displaying video of a remote participant 312. Participant 308 and display 310 are within the view of the video camera 302.

Figure 3B:
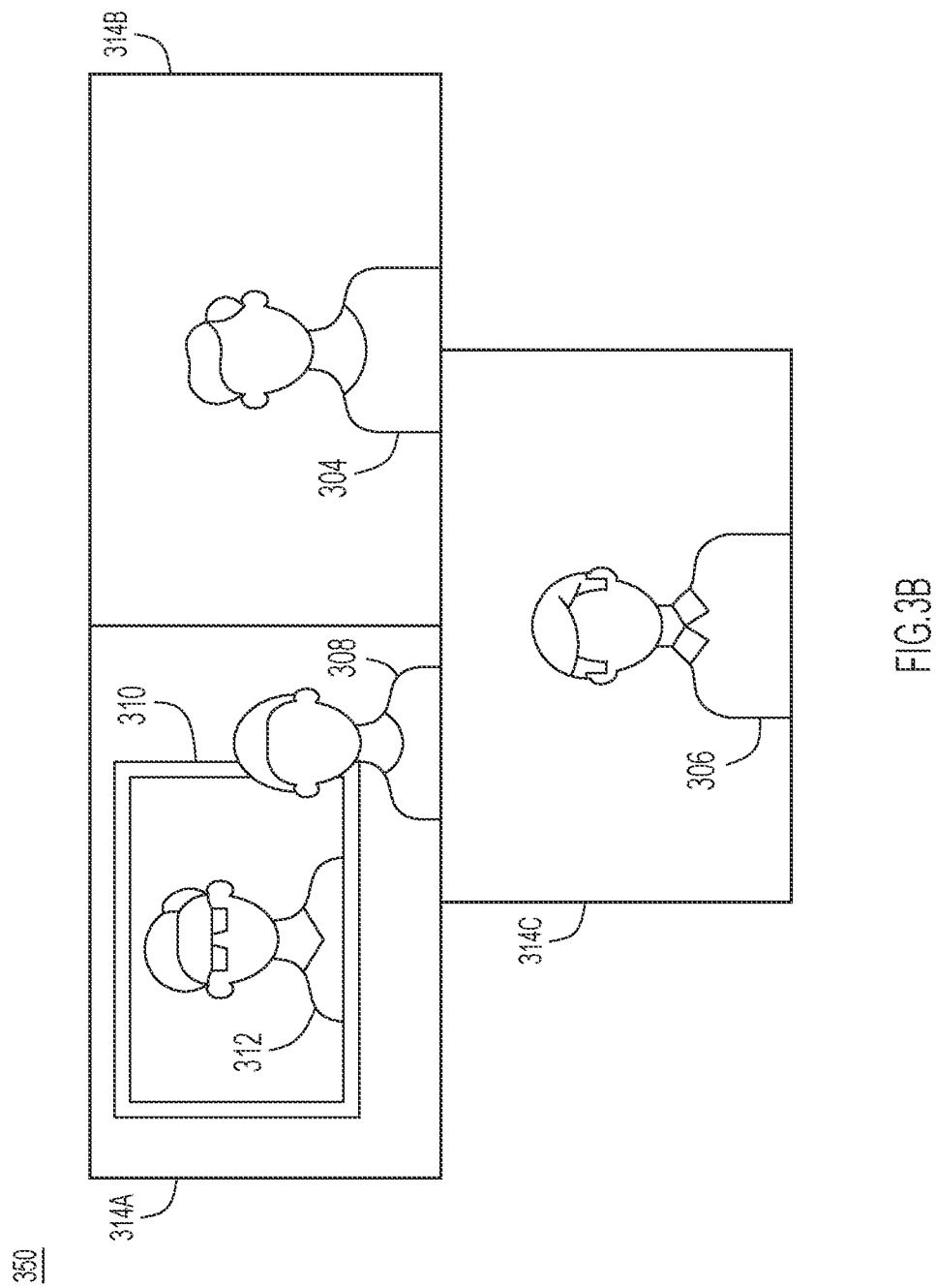
FIG. 3B is a block diagram of a video layout showing assignment to respective windows of outgoing video from a video conference room for a video conference session, according to an example embodiment.

FIG. 3B is a diagram of a video layout 350 showing assignment to respective windows of video layout 350 of outgoing video from conference room 301 for video conference session 300, depicted and described with reference to FIG. 3A.

As depicted, video layout 350 includes windows or panes 314A, 314B, and 314C, and each window includes a video of a participant (participants 308, 304, and 306, respectively) in the video conference room 301. Despite participant 308 being physically in front of, or otherwise adjacent to, display 310, the techniques presented herein can perform facial analysis and other operations to determine that a participant (e.g., participant 308) is not being displayed on a display in the conference room, but is instead in a physical position in which the user might appear to be on a display (e.g., because participant 308 is in front of display 310). In particular, the face of the participant (e.g., participant 308) in the captured video by video camera 302 can be compared to faces of other participants (including both participants who are local and/or remote with respect to conference room 301) to confirm that participant 308 is local to the video conference room 301. Thus, participant 308 is assigned to a window (e.g., window 314A). In some embodiments, video of participant 312, which is visible in display 310, may be detected as video for a remote participant, and video corresponding to this video can be blurred or otherwise removed from the outgoing video in video layout 350. Moreover, the face shown on the display 310 may be a face of a person in a content being shared by a remote or a local participant (document, video, etc.) during the video conference session. The techniques presented herein are applicable to ensure that the face presented on display 310, whether it is real-time video of a remote meeting participant, or the face in some shared content, is not mistaken as a face of a local participant in the video conference room 301, and thus is not assigned its own window or pane in outgoing video from video conference room 301.

Figure 4:
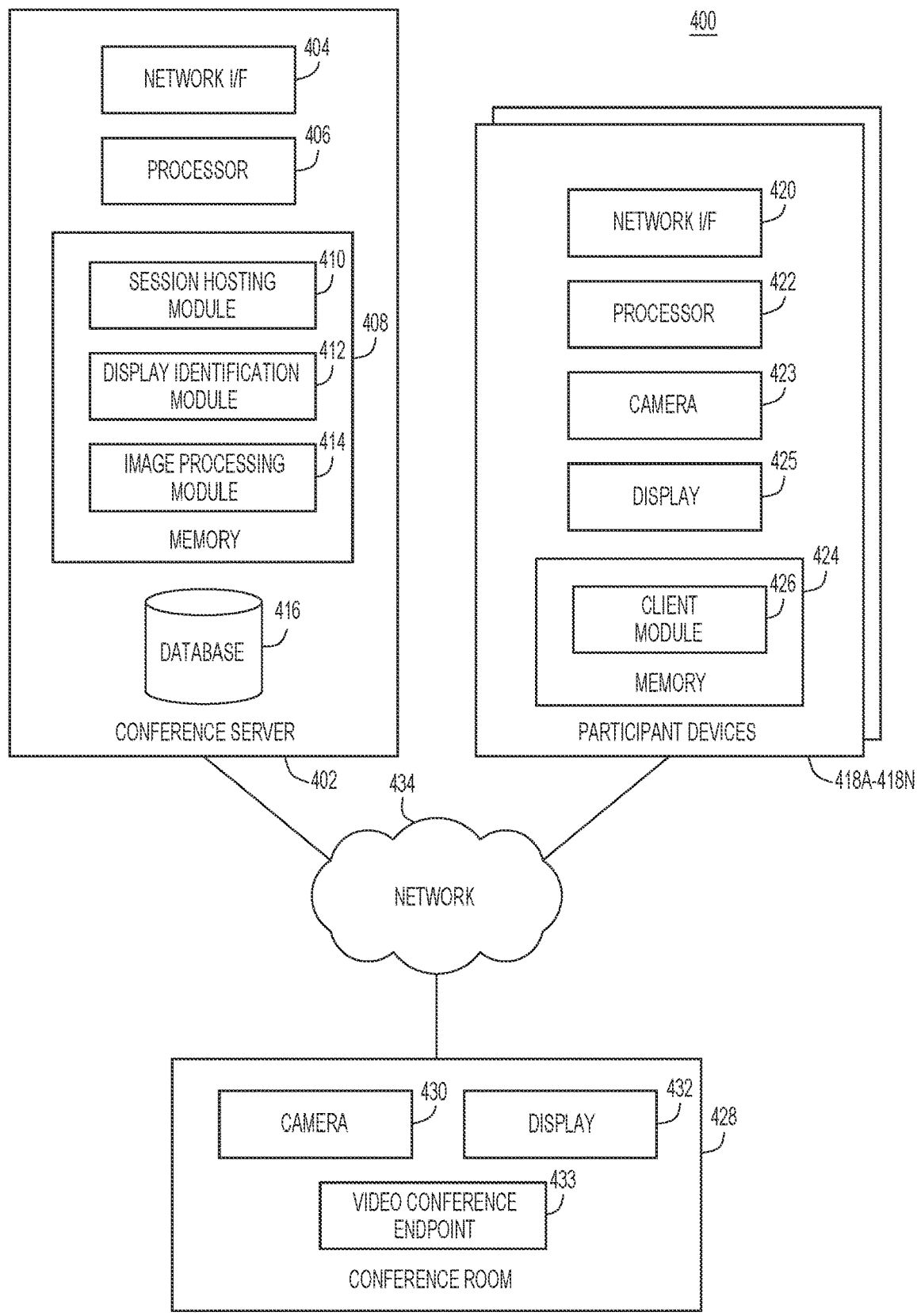
FIG. 4 is a block diagram of a network environment for conducting video conference sessions, according to an example embodiment.

FIG. 4 is a block diagram in which a network environment 400 for conducting video conference sessions, according to an example embodiment. As depicted, network environment 400 includes a conference server 402, a plurality of participant devices 418A-418N, and a video conference room endpoint associated with a video conference room 428 including devices that are in communication via a network 434. It is to be understood that the functional division among components have been chosen for purposes of explaining various embodiments and is not to be construed as a limiting example.

Conference server 402 includes a network interface (I/F) 404, at least one processor (computer processor) 406, memory 408 (which stores instructions for a session hosting module 410, a display identification module 412, and an image processing module 414), and a database 416. In various embodiments, conference server 402 may include a rack-mounted server, laptop, desktop, smartphone, tablet, or any other programmable electronic device capable of executing computer readable program instructions. Network interface 404 enables components of conference server 402 to send and receive data over a network, such as network 434. Conference server 402 may facilitate conferencing sessions in accordance with present embodiments, including exchanging video and/or audio data between participant devices, performing auto-framing operations, and identifying and preventing the assignment of video containing a face of a participant who is not a local participant.

Session hosting module 410, display identification module 412, and image processing module 414 may include one or more modules or units to perform various functions of the embodiments described below. Session hosting module 410, display identification module 412, and image processing module 414 may be implemented by any combination of any quantity of software and/or hardware modules or units, and may reside within memory 408 of conference server 402 for execution by a processor, such as processor 406.

In various embodiments, any of session hosting module 410, display identification module 412, and image processing module 414 can process video data by performing various transforms or other operations (e.g., by processing frames or portions thereof), including rotating operations, scaling operations (enlarging or shrinking video data or portions thereof), keystoning operations (e.g., any geometrical transform operations that skew a two-dimensional set of pixels by adjusting the location of one or more vertices of a polygon and processing pixels within the polygon accordingly), mirroring operations (e.g., flipping an image with respect to one or more axes), and any other operations, including combinations thereof.

Session hosting module 410 may perform operations relating to initiating and hosting conferencing sessions between participants, including facilitating the exchange of data between endpoint devices of participants. Session hosting module 410 may facilitate the exchange of video data, audio data, and/or text data during a conferencing session so that users can communicate with each other during the session. The data that is exchanged may be received from video cameras, microphones, and/or other input devices, and can be obtained from, and/or provided to, any devices participating in a conferencing session.

Session hosting module 410 may perform auto-framing operations by processing video data that is obtained from any video camera of a device that can participate in a conferencing session. The auto-framing operations can include object recognition that identify the presence of participants in video, and extract a portion of the video corresponding to each participant so that each participant can be assigned to a window in a video layout and accordingly presented to the other participants. In various embodiments, auto-framing operations can extract a portion of video corresponding to a participant's face, head, head and upper body, entire body, or any other desired details relating to a participant. Thus, auto-framing operations may capture some background and/or foreground details in proximity to a participant, such as a display behind the participant, a chair, a table, etc. Session hosting module 410 may determine whether to assign a recognized participant to a window based on input from other modules, including display identification module 412 and/or image processing module 414.

Display identification module 412 may include logic for identifying any displays that are in view of a video camera that is configured to participate in a conferencing session. Display identification module 412 may be in communication with each display in a conference room (e.g., display 432 of conference room 428) in order to cause image or video data to be presented by each display. Display identification module 412 may provide image or video data to a display via a connector (e.g., a Video Graphics Array (VGA) connector, a High-Definition Multimedia Interface (HDMI) connector, etc.) or via a network connection to a network-accessible device that is configured to provide output to a display. Display identification module 412 can provide preselected images to displays in order to identify the displays based on video captured by one or more video cameras. In particular, display identification module 412 can cause a known image to be displayed on a display, and can analyze video data obtained from one or more video cameras to identify the presence of the known image in the video data. Display identification module 412 can perform various transform operations on video data, or portions thereof, to determine whether there are elements in the video data that match the known image. Thus, display identification module 412 can identify an image being displayed on a display, and thus, the presence of a display itself, even when the image is mirrored on the display, or the display is at an angle to the video camera (which may cause skewing). The preselected image may include elements that make the image asymmetrical so that any mirroring or other effects can be identified based on the processing of display identification module 412. In some embodiments, the preselected image is a pattern, such as an image similar to those used to test television displays (e.g., a National Television System Committee (NTSC) test pattern). The image may include multiple colors, or the image can be a black-and-white or greyscale image.

When a preselected image is identified by display identification module 412, the areal bounds of the image can be determined in order to identify a location of a display with respect to the video camera capturing the display. This area can be saved for future use so that any locations in a video stream that are associated with detected displays can be analyzed in accordance with present embodiments. In some embodiments, display identification module 412 causes different images to be displayed on different displays so that a location for each individual display can be determined with particularity.

Image processing module 414 may analyze video data captured by one or more video cameras in order to identify the presence of participants in the video data and to ensure that any faces being displayed in a video display in a conference room is not assigned to its own window or pane in outgoing video. Image processing module 414 may obtain video data from one or more video cameras, including any video cameras in a conference room, video cameras of remote participants, and/or content being shared onto a display (e.g., a shared presentation or other content etc.) and may analyze the video data to compare images of participants with images corresponding to identified displays in a conference room. In some embodiments, image processing module 414 analyzes video data that is preprocessed, including video data that is obtained by performing auto-framing operations.

Image processing module 414 may compare video data that corresponds to the known location of a display to video of remote participants and/or video of content being shared to any display. If there is a match, then it can be determined that the display is presenting video that includes a face of a person not physically present in the conference room, and thus, the area of the display should not be assigned its own window or pane. However, if there is no match between the area of a display and an auto-framed video feed, that area may be assigned its own feed if it is determined that there is nevertheless a face present in that area that does not match a face of a remote participant or a face contained in content being shared to a display (because a participant may be physically present in front of a display, rather than being presented on the display itself).

In order to determine a match, image processing module 414 may employ one or more image processing models or algorithms, including a trained machine learning model. In some embodiments, a machine learning model can be trained using a training set of images of users, and corresponding images of displays in which those users are being presented. The machine learning model can be trained until a desired level of accuracy is attained with regard to correctly identifying, using a portion of the training data that is reserved as testing data, that an image of a user and an image of a display in which a user is being presented are the same user. In various embodiments, image processing module 414 may include one or more models, including neural networks and other models. The model(s) employed by image processing module 414 can include, for example, a Siamese network model (a model that includes two identical neural networks that calculate feature embeddings for each face and then assess the similarity between these embeddings), a triplet network model (which learns embeddings such that the distance between embeddings of the same person's faces is minimized while maximizing the distance between those of different individuals), a dedicated deep learning model for face recognition (which may map faces into a high-dimensional space in a manner such that the Euclidean distance between face embeddings corresponds to their similarity), or a deep Convolutional Neural Network (CNN) model.

Database 416 may include any non-volatile storage media known in the art. For example, database 416 can be implemented with a tape library, optical library, one or more independent hard disk drives, or multiple hard disk drives in a redundant array of independent disks (RAID). Similarly, data stored in database 416 may conform to any suitable storage architecture known in the art, such as a file, a relational database, an object-oriented database, and/or one or more tables. Database 416 may store data describing locations of identified displays with respect to video cameras (which can be described using a coordinate system). The data describing locations of identified displays may be re-used between conferencing sessions, or may be updated periodically or for each new session; thus, locations of identified displays can be accurately stored even when the positions of video cameras with respect to displays are modified).

Participant devices 418A-418N may each include a network interface (I/F) 420, at least one processor (computer processor) 422, a camera 423 (e.g., a video camera), a display 425, and memory 424 (which stores instructions for a client module 426). In various embodiments, each participant device 418A-418N may include a rack-mounted server, laptop, desktop, smartphone, tablet, or any other programmable electronic device capable of executing computer readable program instructions. Network interface 420 enables components of each participant device 418A-418N to send and receive data over a network, such as network 434. Each participant device 418A-418N may include one or more modules or units to perform various functions of the embodiments described below. In particular, client module 426 may be implemented by any combination of any quantity of software and/or hardware modules or units, and may reside within memory 424 of each participant device 418A-418N for execution by a processor, such as processor 422. In some embodiments, at least one participant device of participant devices 418A-418N is present in conference room 428. Each participant device 418A-418N may acquire video data of participants via camera 423, and can present data (e.g., video data of other participants) via display 425.

Client module 426 may perform various operations to enable a user of each participant device 418A-418N to participate in a conferencing session. Client module 426 may obtain as input video data, audio data, and/or text data from each participant device 418A-418N and share the data to other participant devices. The exchange of data between participants can be performed in real-time or near-real-time in order to enable collaboration between users, and the exchange of data may be facilitated by a server (e.g., session hosting module 410 of conference server 402).

Conference room 428 may include one or more cameras (e.g., camera 430), one or more displays (e.g., display 432), and at least one video conference endpoint 433. Camera 430 may include any conventional or other video camera, such as a webcam or other camera, and display 432 may include any display device, such as a liquid crystal display (LCD), light-emitting diode (LED) display, cathode ray tube (CRT) display, a projector, and the like. Conference room 428 may be used by participants in a video conference session to collaborate with remote participants in the video conference session, such as any remote users of participant devices 418A-418N. Data acquired by camera 430 may be provided to conference server 402 for analysis in accordance with present embodiments in order to identify display 432, including the location of display 432. Video conference endpoint 433 may include hardware and/or software for facilitating video conference sessions, and can be a computing system in which camera 430 and/or display 432 are integrated, or video conference endpoint 433 may otherwise communicate with camera 430 and/or display 432. In some embodiments, video conference endpoint 433 implements some or all of the modules of conference server 402, or video conference endpoint 433 may otherwise be configured to perform similar operations. In one embodiment, video conference endpoint 433 performs auto-framing operations by analyzing video obtained by camera 430 to detect participants and assign each participant to a window. Video conference endpoint 433 may perform operations in accordance with present embodiments.

Network 434 may include a local area network (LAN), a wide area network (WAN) such as the Internet, or a combination of the two, and includes wired, wireless, or fiber optic connections. In general, network 434 can be any combination of connections and protocols known in the art that will support communications between conference server 402, participant devices 418A-418N, and/or devices of conference room 428 via their respective network interfaces in accordance with the described embodiments.

Figure 5:
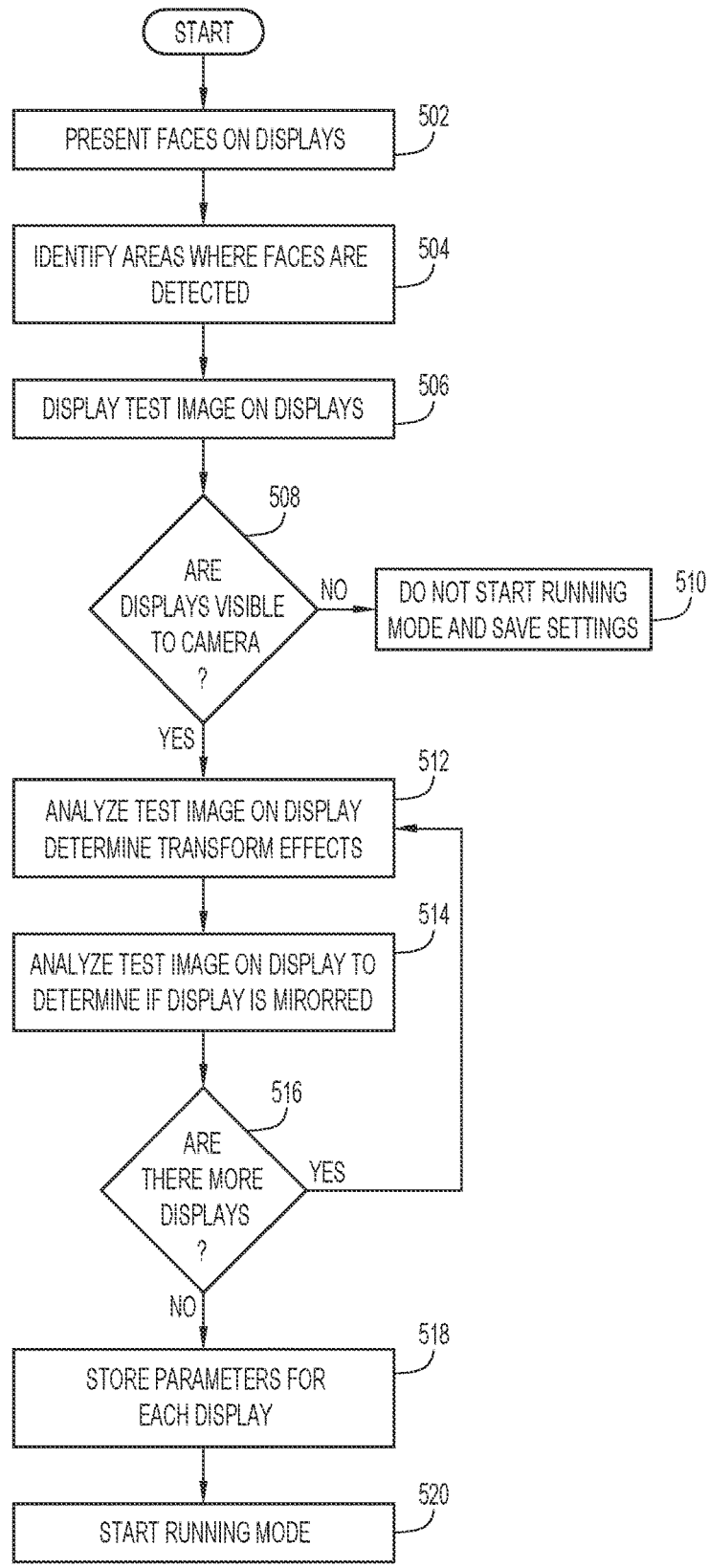
FIG. 5 is a flow chart of a method for configuring a video conference session, according to an example embodiment.
Figure 6:
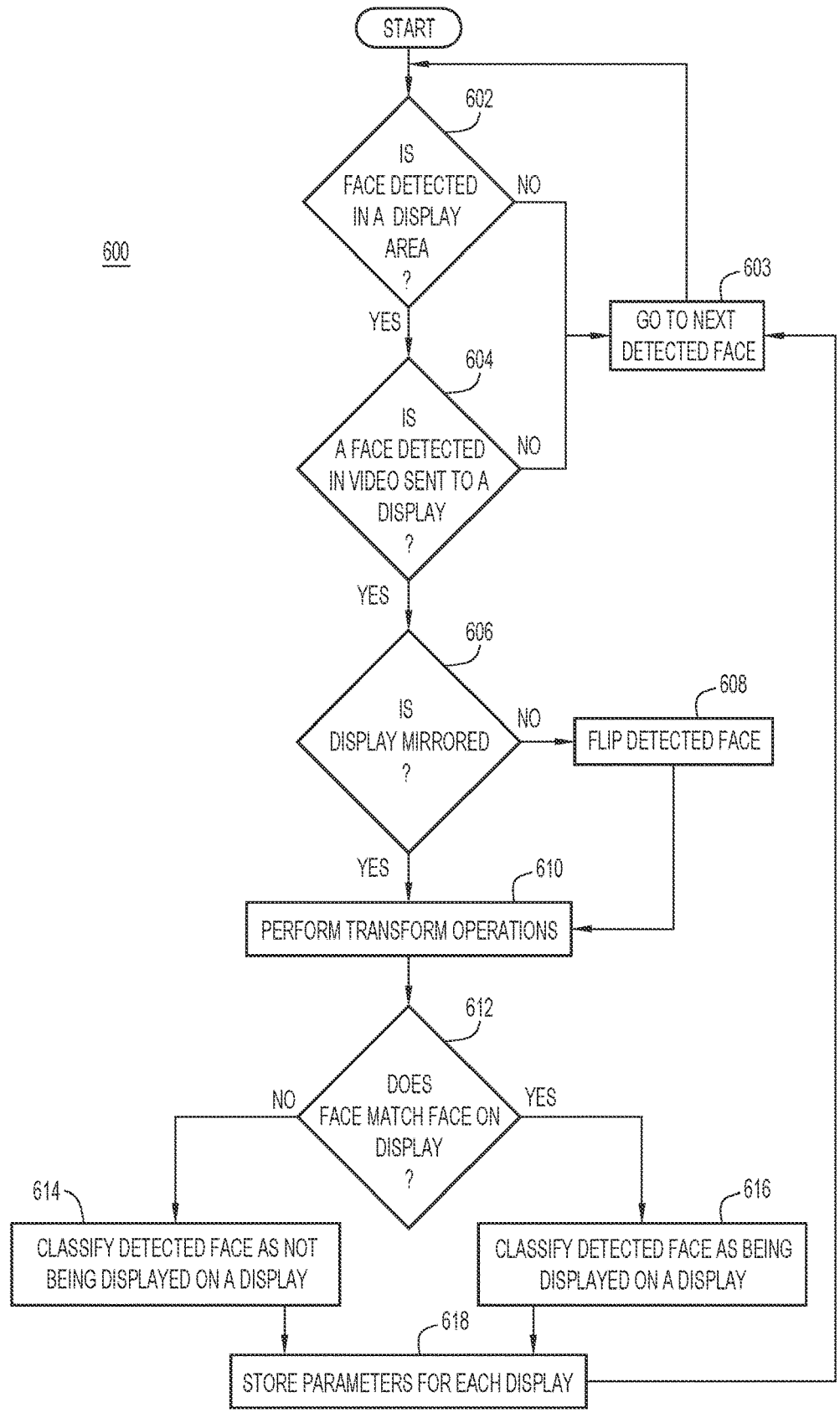
FIG. 6 is a flow chart of a method for conducting a video conference session, according to an example embodiment.

FIG. 5 is a flow chart of a method 500 performed during an offline or setup mode to enable performing of a method depicted in FIG. 6 during runtime, according to an example embodiment. One purpose for the method 500 is to detect if and where video screens (displays) are in the view of each video camera in a conference room. Another function of method 500 is to determine a transfer function from what is displayed on each video display screen to what is received by each video camera. One way to do this is to display different images with boxes or other shapes on each video display screen to find the pixel area each video display screen occupies in each video camera view. This area may be called a "screen area". Since the video conference endpoint is able to select what to show on which display screen in the video conference room, different image content can be presented on each video display screen or a sequence of different image contents can be presented. These displayed boxes or other shapes (or faces) can also be used to determine how a face will change because of the view-angle and the distance from the video camera.

A test video conference can be initiated using video data acquired from a video camera that is imaging a participant's face, or previously-acquired video data containing faces can be provided to the displays in a conference room. The displays may be positioned in locations that are within the view of one or more video cameras in the video conference room. As an example, during this text video conference, faces may be presented on displays at operation 502.

Areas where faces are detected from the video captured by the one or more video cameras may be identified at operation 504. A facial detection model can identify any faces on the display(s) that are present in video data obtained by a video camera. These faces may indicate the presence and locations of any displays that are visible by the video camera. The facial detection model may process video frames whose timestamps correspond to a time at which faces are presented at operation 502. Thus, any frames that lack faces may not require processing.

Test images may be displayed on the displays at operation 506. The test images may be predetermined images and can include patterns or other content/images. In some embodiments, specific test images are displayed on specific displays, whereas in other embodiments, the same test image may be used for multiple displays. The test images may include features, such as asymmetrical portions, which assist in identifying any mirroring on displays or displays that are angled with respect to a video camera. In some embodiments, method 500 may start with operation 506, and operations 502 and 504 may be omitted.

Operation 508 determines whether any displays are visible to a video camera. Video data acquired by one or more video cameras can be analyzed to extract test images that are visible in the video data. Any frames, or portions thereof, containing the test images can be saved for further analysis.

If no displays are visible to a camera, method 500 proceeds to operation 510: running mode is not started, and the settings are saved. Running mode is depicted and described with reference to FIG. 6, and is the process performed to mitigate/eliminate the assignment of video containing a face of a participant who is not a local participant in the local/near end conference room in the video conference session. However, if there are no displays in the video conference room visible to a video camera, there may be no risk of the assignment of video containing a face of a participant who is not a local participant in the local/near end conference room in the video conference session, so a video conference can be initiated after operation 510 with conventional auto-framing techniques, if desired.

If at least one display is visible to a video camera, then a test image on the display is analyzed to determine whether the display is mirrored at operation 512, and is analyzed to determine any transform effects for the display at operation 514. The pattern may be the same pattern as presented in operation 506, and can use video data obtained from displaying the test images at operation 506. Since a test image is a known image, the test image can be compared to video data using image processing techniques to identify if the test image on a display is mirrored and/or skewed in any manner. Thus, video image transform operations can be derived that, when applied to a test image on display, have the effect of transforming that test image into the original test image (e.g., by un-mirroring and/or deskewing the test image on a display). This process can also be used to detect any displays that are not directly visible by a video camera, but are visible in mirrors or other reflective surfaces.

Operation 516 determines whether there are additional displays that have not yet been processed. If there are additional displays, the video data (captured by a video camera) that includes those displays is processed according to operations 512 and 514 to determine any mirroring or transform effects. Otherwise, if there are no remaining displays to be processed, then the parameters for each display are stored at operation 518. The parameters may describe each display in terms of its location in captured video data frames, whether a display is mirrored, and/or whether a display is skewed in some manner. In some embodiments, the parameters may include instructions for un-mirroring and/or deskewing any video data that corresponds to a detected display. These parameters may be stored for use during running mode.

Running mode may be initiated at operation 520. When running mode is initiated, the video containing a face of a participant who is not a local participant in the local/near end conference room in the video conference session can be detected and remediated according to present embodiments using the stored parameters for each detected display.

FIG. 6 is a flow chart of a method 600 for conducting a video conference session, according to an example embodiment. Method 600 may correspond to the aforementioned running mode for video conference sessions that are conducted in accordance with present embodiments. In some embodiments, the setup mode (e.g., method 500 that is described in reference to FIG. 5) may be performed prior to each execution of method 600; thus, method 600 may initially determine whether a setup mode was previous executed. In some embodiments, a setup mode is applied prior to each execution of method 600; in other embodiments, a setup mode is applied once and those settings are used for each execution of method 600, or a new setup mode is applied when a previous setup mode has been executed beyond a threshold amount of time (e.g., in the case that relying on a previous setup mode would use data that may be out of date).

Operation 602 determines whether a face is detected in a display area. The display area may refer to a portion of video data captured by a video camera in the video conference room. The display area can be determined by analyzing video data using test images, as depicted and described with reference to FIG. 5. Video data corresponding to a display area can be analyzed using image processing techniques (e.g., image processing algorithms, trained machine learning models, etc.) to identify the presence of a face. Since a display is present in a conference room in which participants may be present, detecting a face in a display area may not indicate that the face is being presented by the display, as a participant can be physically present in front of a display (e.g., substantially aligning with a predetermined location of a display from the point of view of a camera).

If there is no face in a particular display area, then method 600 proceeds to operation 603 to analyze a next detected face, and can return to operation 602 to determine whether the face is in a display area at operation 602. Method 600 can thus repeat for each face that is visible to a video camera.

If a face is present in the video data that includes a display area, then operation 604 determines whether the face is detected in video sent to a display. The face that is detected may be compared to video obtained from other video cameras (e.g., video cameras associated with participants that are remote with respect to the conference room), or other content being shared to a display, using one or more image processing techniques (e.g., image processing algorithms, trained machine learning models, etc.). If the face is not associated with video sent to a display, then method 600 proceeds to operation 603 and analyzes a next face until each face has been processed accordingly. In some embodiments, any video data captured by a video camera that corresponds to a face of a remote participant is altered (blurred, omitted, or otherwise) removed, before providing the video data captured by that video camera to other users. Thus, remote participants may not see their own faces being presented in a video conference session in the event that a display would otherwise present their face and be captured by a video camera in the conference room.

If a face is detected in video sent to a display at operation 604, then method 600 proceeds to operation 606, which determines whether the display is mirrored. If the display is mirrored, the video data corresponding to the face is flipped at operation 608. Otherwise, method 600 performs any transform operations, if necessary, at operation 610. Operations 608 and 610 can be performed based on the parameters stored for each display, which can be obtained via a setup mode (e.g., as depicted and described with reference to method 500 and FIG. 5).

Once the transform operations are applied to video data corresponding to a face, then this processed video data can be compared to faces of other video at operation 612. If the faces match, as determined using image processing techniques described herein, then method 600 proceeds to operation 616, and classifies the face as a face that is being displayed on a display from video obtained from a remote participant. Otherwise, method 600 proceeds to operation 614, and classifies the face as a face that is not being displayed on a display.

The parameters for each display are stored at operation 618. The parameters may include the outcomes of operation 612 for each face. A video conference session can be initiated in which auto-framing is performed to assign each user's face to a window. However, if a face has been classified as being displayed on a display (operation 616), then that face may not be assigned to its own window, and instead, is omitted from auto-framing operations. Thus, the assignment of video containing a face of a participant who is not a local participant in the local/near end conference room in the video conference session is prevented.

Figure 7:
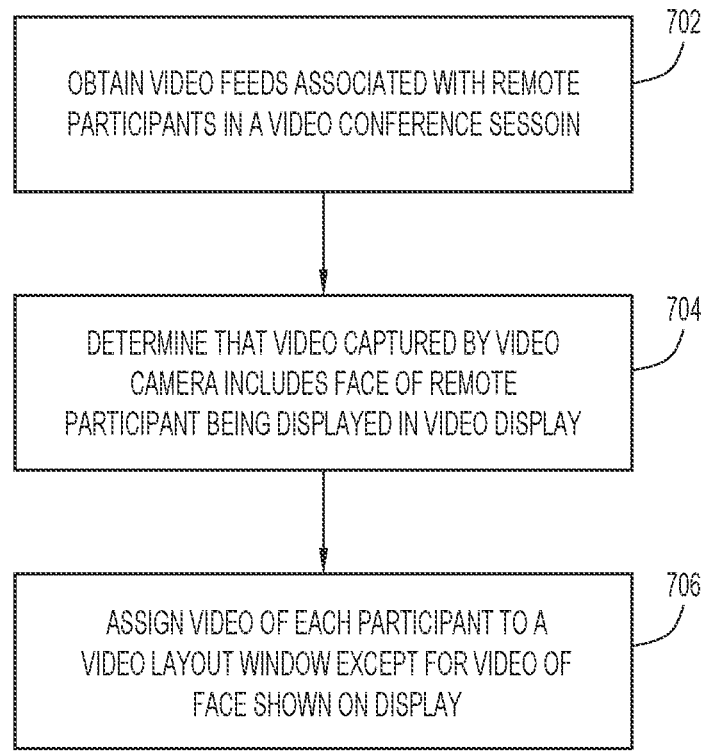
FIG. 7 is a flow chart of a method for preventing a face captured by a video camera in a local conference room (of a participant who is not physically present in the local conference room) that is displayed on a video display screen in the local conference room from being assigned a separate window for outgoing video in a video conference session, according to an example embodiment.

FIG. 7 is a flow chart of a method 700 for preventing a face captured by a video camera in a local conference room (of a participant who is not physically present in the local conference room) that is displayed on a video display screen in the local conference room from being assigned a separate window for outgoing video in a video conference session, according to an example embodiment.

Video associated with one or more remote participants in a video conference session are obtained at operation 702. A video conference session may include local and remote participants with respect to a conference room: local participants may be present in the conference room, and remote participants may be connected to the video conference session via a network. Each video feed may be obtained from an endpoint device of each remote participant, and video of local participants can be obtained via one or more video cameras that are present in the conference room. Additionally, the conference room includes one or more displays that can display video of one or more remote participants. The physical arrangement of equipment in a conference room may be arranged such that a display in the conference room is visible by a video camera in the conference room.

Operation 704 determines that video captured by a video camera includes a face of a remote participant that is being displayed in a video display. During a video conference session (or during initiation of a video conference session), video of remote participants and/or other video of content being shared to displays are compared to video captured by the video camera in a conference room that corresponds to a location of a display. Faces can be compared using a machine learning model that identifies a match between two faces. In some embodiments, operations may be performed prior to a conference session to identify the presence and location of any display that is visible to the camera in the conference room. Thus, only a portion of video corresponding to the location of a display may be analyzed. In some embodiments, transform operations such as keystoning, scaling, and/or mirroring, are performed on video data prior to comparing video data to determine whether there is a match in the faces depicted therein.

Video of each participant is assigned to a video layout window except for video of the face that is being shown on a video display, at operation 706. Each local, physically-present participant is assigned to a window using auto-framing techniques, except for any face that is detected on a display in the local video conference room.

Figure 8:
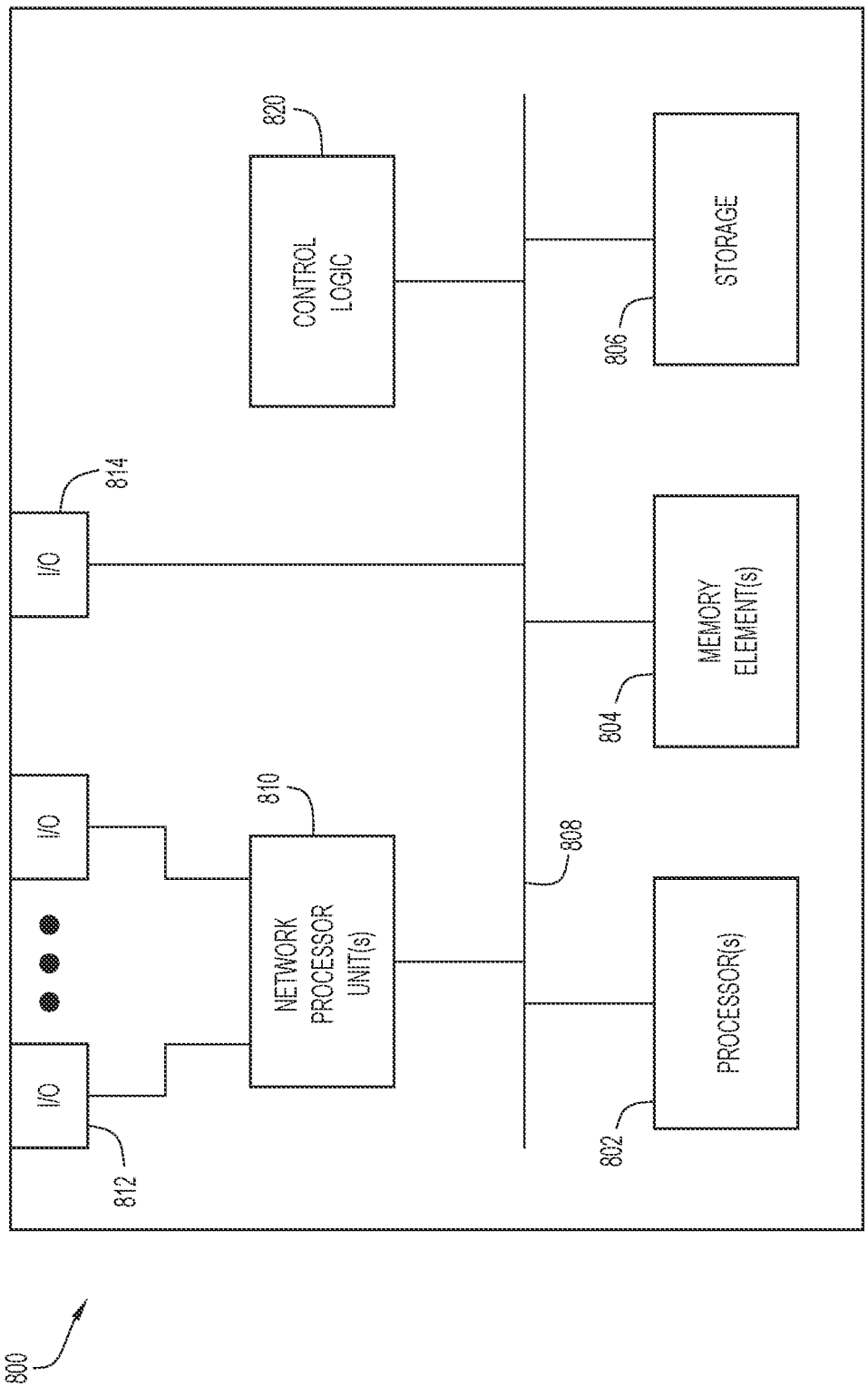
FIG. 8 is a block diagram of a device that may be configured to perform operations relating to video conference, as presented herein.

Referring now to FIG. 8, FIG. 8 illustrates a hardware block diagram of a computing device 800 that may perform functions associated with operations discussed herein in connection with the techniques depicted in FIGS. 1-7. In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, base-band signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O 814 allow for input and output of data and/or information with other entities that may be connected to computing device 800. For example, I/O 814 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining one or more videos in a video conference session that includes one or more participants in a video conference room, wherein the video conference room includes one or more video displays and at least one video camera, and wherein one or more remote participants are remote with respect to the video conference room; during the video conference session, determining that video captured by the at least one video camera in the video conference room includes a face of a person not physically present in the video conference room and which face is being displayed on the one or more video displays; and assigning to a respective video layout window of a plurality of video layout windows video of each participant in the video conference room except for video of the face of the person not physically present in the video conference room that is displayed on the one or more video displays.

In some aspects, the techniques described herein relate to a computer-implemented method, further including: transmitting, for presentation on a video display in a remote location of the one or more remote participants, the video of each participant in the video conference room for the respective video layout window of the plurality of video layout windows.

In some aspects, the techniques described herein relate to a computer-implemented method, further including: determining a location of each of the one or more video displays in the video conference room that are in view of the at least one video camera in the video conference room.

In some aspects, the techniques described herein relate to a computer-implemented method, wherein the determining the location of the one or more video displays includes: displaying a predetermined image to the one or more video displays; and determining that the predetermined image is captured by the at least one video camera in the video conference room.

In some aspects, the techniques described herein relate to a computer-implemented method, further including: processing a portion of video data captured by the at least one video camera that corresponds to the location of the one or more video displays by performing one or more transform operations; and performing the one or more transform operations to the portion of the video data.

In some aspects, the techniques described herein relate to a computer-implemented method, wherein the one or more transform operations are selected from a group of: a keystone operation, a scaling operation, and a mirror operation.

In some aspects, the techniques described herein relate to a computer-implemented method, further including: during the video conference session, generating a blurred version of video data captured by the at least one video camera that corresponds to the face of the person not physically present in the video conference room that is displayed on the one or more video displays.

In some aspects, the techniques described herein relate to a computer-implemented method, wherein determining that the video captured by the at least one video camera in the video conference room includes the face of the person not physically present includes using a machine learning model to determine that the face displayed on the one or more video displays matches a particular face of the one or more remote participants in the video conference session.

In some aspects, the techniques described herein relate to a computer-implemented method, wherein determining that the video captured by the at least one video camera in the video conference room includes the face of the person not physically present includes using a machine learning model to determine that the face displayed on the one or more video displays matches a particular face in content being displayed on the one or more video displays.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain one or more videos in a video conference session that includes one or more participants in a video conference room, wherein the video conference room includes one or more video displays and at least one video camera, and wherein one or more remote participants are remote with respect to the video conference room; during the video conference session, determine that video captured by the at least one video camera in the video conference room includes a face of a person not physically present in the video conference room and which face is being displayed on the one or more video displays; and assign to a respective video layout window of a plurality of video layout windows video of each participant in the video conference room except for video of the face of the person not physically present in the video conference room that is displayed on the one or more video displays.

In some aspects, the techniques described herein relate to a system, wherein the program instructions further include instructions to: transmit, for presentation on a video display in a remote location of the one or more remote participants, the video of each participant in the video conference room for the respective video layout window of the plurality of video layout windows.

In some aspects, the techniques described herein relate to a system, wherein the program instructions further include instructions to: determine a location of each of the one or more video displays in a video conference room that are in view of the at least one video camera in the video conference room.

In some aspects, the techniques described herein relate to a system, wherein the instructions for determining the location of the one or more video displays include instructions to: display a predetermined image to the one or more video displays; and determine that the predetermined image is captured by the at least one video camera in the video conference room.

In some aspects, the techniques described herein relate to a system, further including instructions to: process a portion of video data captured by the at least one video camera that corresponds to the location of the one or more video displays by performing one or more transform operations; and perform the one or more transform operations to the portion of the video data.

In some aspects, the techniques described herein relate to a system, wherein the one or more transform operations are selected from a group of: a keystone operation, a scaling operation, and a mirror operation.

In some aspects, the techniques described herein relate to a system, further including instructions to: during the video conference session, generate a blurred version of video data captured by the at least one video camera that corresponds to the face of the person not physically present in the video conference room that is displayed on the one or more video displays.

In some aspects, the techniques described herein relate to one or more non-transitory computer readable storage media having program instructions embodied therewith, the program instructions executable by a computer to cause the computer to perform operations that include: obtain one or more videos in a video conference session that includes one or more participants in a video conference room, wherein the video conference room includes one or more video displays and at least one video camera, and wherein one or more remote participants are remote with respect to the video conference room; during the video conference session, determine that video captured by the at least one video camera in the video conference room includes a face of a person not physically present in the video conference room and which face is being displayed on the one or more video displays; and assign to a respective video layout window of a plurality of video layout windows video of each participant in the video conference room except for video of the face of the person not physically present in the video conference room that is displayed on the one or more video displays.

In some aspects, the techniques described herein relate to one or more non-transitory computer readable storage media, wherein the program instructions further cause the computer to: transmit, for presentation on a video display in a remote location of the one or more remote participants, the video of each participant in the video conference room for the respective video layout window of the plurality of video layout windows.

In some aspects, the techniques described herein relate to one or more non-transitory computer readable storage media, wherein the program instructions further cause the computer to: determine a location of each of the one or more video displays in a video conference room that are in view of the at least one video camera in the video conference room.

In some aspects, the techniques described herein relate to one or more non-transitory computer readable storage media, wherein the instructions for determining the location of the one or more video displays cause the computer to: display a predetermined image to the one or more video displays; and determine that the predetermined image is captured by the at least one video camera in the video conference room.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    obtaining one or more videos in a video conference session that includes one or more participants in a video conference room, wherein the video conference room includes one or more video displays and at least one video camera, and wherein one or more remote participants are remote with respect to the video conference room;
    during the video conference session, determining that video captured by the at least one video camera in the video conference room includes a face of a person not physically present in the video conference room and which face is being displayed on the one or more video displays; and
    assigning to a respective video layout window of a plurality of video layout windows, video of each participant in the video conference room except for video of the face of the person not physically present in the video conference room that is displayed on the one or more video displays.

2. The computer-implemented method of claim 1, further comprising:
    transmitting, for presentation on a video display in a remote location of the one or more remote participants, the video of each participant in the video conference room for the respective video layout window of the plurality of video layout windows.

3. The computer-implemented method of claim 1, further comprising:
    determining a location of each of the one or more video displays in the video conference room that are in view of the at least one video camera in the video conference room.

4. The computer-implemented method of claim 3, wherein the determining the location of the one or more video displays includes:
    displaying a predetermined image to the one or more video displays; and
    determining that the predetermined image is captured by the at least one video camera in the video conference room.

5. The computer-implemented method of claim 4, further comprising:
processing a portion of video data captured by the at least one video camera that corresponds to the location of the one or more video displays by performing one or more transform operations; and
performing the one or more transform operations to the portion of the video data.

6. The computer-implemented method of claim 5, wherein the one or more transform operations are selected from a group of: a keystone operation, a scaling operation, and a mirror operation.

7. The computer-implemented method of claim 1, further comprising:
during the video conference session, generating a blurred version of video data captured by the at least one video camera that corresponds to the face of the person not physically present in the video conference room that is displayed on the one or more video displays.

8. The computer-implemented method of claim 1, wherein determining that the video captured by the at least one video camera in the video conference room includes the face of the person not physically present includes using a machine learning model to determine that the face displayed on the one or more video displays matches a particular face of the one or more remote participants in the video conference session.

9. The computer-implemented method of claim 1, wherein determining that the video captured by the at least one video camera in the video conference room includes the face of the person not physically present includes using a machine learning model to determine that the face displayed on the one or more video displays matches a particular face in content being displayed on the one or more video displays.

10. A system comprising:
one or more computer processors;
one or more computer readable storage media; and
program instructions stored on the one or more computer readable storage media for execution by at least one of the one or more computer processors, the program instructions comprising instructions to:
obtain one or more videos in a video conference session that includes one or more participants in a video conference room, wherein the video conference room includes one or more video displays and at least one video camera, and wherein one or more remote participants are remote with respect to the video conference room;
during the video conference session, determine that video captured by the at least one video camera in the video conference room includes a face of a person not physically present in the video conference room and which face is being displayed on the one or more video displays; and
assign to a respective video layout window of a plurality of video layout windows, video of each participant in the video conference room except for video of the face of the person not physically present in the video conference room that is displayed on the one or more video displays.

11. The system of claim 10, wherein the program instructions further comprise instructions to:
transmit, for presentation on a video display in a remote location of the one or more remote participants, the video of each participant in the video conference room for the respective video layout window of the plurality of video layout windows.

12. The system of claim 10, wherein the program instructions further comprise instructions to:
determine a location of each of the one or more video displays in a video conference room that are in view of the at least one video camera in the video conference room.

13. The system of claim 12, wherein the instructions for determining the location of the one or more video displays include instructions to:
display a predetermined image to the one or more video displays; and
determine that the predetermined image is captured by the at least one video camera in the video conference room.

14. The system of claim 13, further comprising instructions to:
process a portion of video data captured by the at least one video camera that corresponds to the location of the one or more video displays by performing one or more transform operations; and
perform the one or more transform operations to the portion of the video data.

15. The system of claim 14, wherein the one or more transform operations are selected from a group of: a keystone operation, a scaling operation, and a mirror operation.

16. The system of claim 10, further comprising instructions to:
during the video conference session, generate a blurred version of video data captured by the at least one video camera that corresponds to the face of the person not physically present in the video conference room that is displayed on the one or more video displays.

17. One or more non-transitory computer readable storage media having program instructions embodied therewith, the program instructions executable by a computer to cause the computer to perform operations that include:
obtain one or more videos in a video conference session that includes one or more participants in a video conference room, wherein the video conference room includes one or more video displays and at least one video camera, and wherein one or more remote participants are remote with respect to the video conference room;
during the video conference session, determine that video captured by the at least one video camera in the video conference room includes a face of a person not physically present in the video conference room and which face is being displayed on the one or more video displays; and
assign to a respective video layout window of a plurality of video layout windows, video of each participant in the video conference room except for video of the face of the person not physically present in the video conference room that is displayed on the one or more video displays.

18. The one or more non-transitory computer readable storage media of claim 17, wherein the program instructions further cause the computer to:
transmit, for presentation on a video display in a remote location of the one or more remote participants, the video of each participant in the video conference room for the respective video layout window of the plurality of video layout windows.

19. The one or more non-transitory computer readable storage media of claim 17, wherein the program instructions further cause the computer to:
   determine a location of each of the one or more video displays in a video conference room that are in view of the at least one video camera in the video conference room.

20. The one or more non-transitory computer readable storage media of claim 19, wherein the instructions for determining the location of the one or more video displays cause the computer to:
   display a predetermined image to the one or more video displays; and
   determine that the predetermined image is captured by the at least one video camera in the video conference room.

* * * * *